(12) United States Patent
Saroka et al.

(10) Patent No.: US 11,339,998 B2
(45) Date of Patent: May 24, 2022

(54) TRANSPORT REFRIGERATION UNIT CONTROL WITH AN ENERGY STORAGE DEVICE

(71) Applicant: Carrier Corporation, Palm Beach Gardens, FL (US)

(72) Inventors: Mary D. Saroka, Syracuse, NY (US); Jeffrey J. Burchill, Baldwinsville, NY (US); Yu Chen, Manlius, NY (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 156 days.

(21) Appl. No.: 16/619,870

(22) PCT Filed: Jun. 6, 2018

(86) PCT No.: PCT/US2018/036299
§ 371 (c)(1),
(2) Date: Dec. 5, 2019

(87) PCT Pub. No.: WO2018/226857
PCT Pub. Date: Dec. 13, 2018

(65) Prior Publication Data
US 2020/0207185 A1    Jul. 2, 2020

Related U.S. Application Data

(60) Provisional application No. 62/516,218, filed on Jun. 7, 2017.

(51) Int. Cl.
*F25B 27/00* (2006.01)
*B60H 1/32* (2006.01)
*B60H 1/00* (2006.01)

(52) U.S. Cl.
CPC ......... *F25B 27/00* (2013.01); *B60H 1/00428* (2013.01); *B60H 1/00807* (2013.01);
(Continued)

(58) Field of Classification Search
CPC ............ B60H 1/00428; B60H 1/00014; B60H 1/00585; B60H 1/00985; B60H 1/3208; B60H 1/3222; B60H 1/3232
See application file for complete search history.

(56) References Cited

U.S. PATENT DOCUMENTS

| 4,780,618 A | 10/1988 | Wareman et al. |
| 6,700,214 B2 * | 3/2004 | Ulinski ................. H02J 7/1476 290/40 C |

(Continued)

FOREIGN PATENT DOCUMENTS

| CN | 105811570 A | 7/2016 |
| CN | 106292421 A | 1/2017 |

(Continued)

OTHER PUBLICATIONS

ISR/WO, dated Sep. 11, 2018, 13 pages.

*Primary Examiner* — Nelson J Nieves
(74) *Attorney, Agent, or Firm* — Cantor Colburn LLP

(57) ABSTRACT

A transport refrigeration unit (TRU) system is provided and includes a TRU and an energy storage device (ESD). The TRU includes components which are configured to control an environment and a TRU controller configured to control the components in accordance with component operating settings. The ESD includes an ESD controller receptive of identification data identifying the components, current condition data reflective of current conditions and control data reflective of a temperature profile. The ESD controller is configured to determine the component operating settings in accordance with the identification, current condition and control data and to issue the component operating settings to the TRU controller.

20 Claims, 9 Drawing Sheets

(52) U.S. Cl.
CPC ....... *B60H 1/00978* (2013.01); *B60H 1/3205* (2013.01); *B60H 1/3232* (2013.01)

(56) References Cited

U.S. PATENT DOCUMENTS

| | | | |
|---|---|---|---|
| 7,673,466 B2 | 3/2010 | Pacey | |
| 8,030,880 B2 * | 10/2011 | Alston | ................ H01M 10/482 |
| | | | 320/103 |
| 8,286,437 B2 | 10/2012 | Sanders et al. | |
| 8,295,950 B1 | 10/2012 | Wordsworth et al. | |
| 8,381,540 B2 * | 2/2013 | Alston | .................. F25D 23/006 |
| | | | 62/236 |
| 8,423,238 B2 | 4/2013 | Shaw et al. | |
| 8,522,564 B2 | 9/2013 | Koppineedi et al. | |
| 8,800,307 B2 | 8/2014 | Thogersen et al. | |
| 8,825,242 B2 | 9/2014 | Foster | |
| 8,863,540 B2 | 10/2014 | Alston et al. | |
| 9,085,218 B2 | 7/2015 | Awwad | |
| 9,297,578 B2 | 3/2016 | Fulmer et al. | |
| 9,352,635 B1 | 5/2016 | Schepmann et al. | |
| 9,407,108 B2 | 8/2016 | Muralidhar et al. | |
| 9,434,237 B2 | 9/2016 | Olaleye | |
| 9,464,839 B2 | 10/2016 | Rusignuolo et al. | |
| 9,557,100 B2 | 1/2017 | Chopko et al. | |
| 9,562,715 B2 | 2/2017 | Kandasamy | |
| 9,987,906 B2 * | 6/2018 | Kennedy | ............... B60H 1/3232 |
| 2003/0106332 A1 * | 6/2003 | Okamoto | ................ F25B 27/00 |
| | | | 62/239 |
| 2004/0168455 A1 * | 9/2004 | Nakamura | ............. B60H 1/004 |
| | | | 62/244 |
| 2005/0065684 A1 * | 3/2005 | Larson | .................... B60R 16/03 |
| | | | 701/36 |
| 2008/0147270 A1 * | 6/2008 | Sakane | ............. B60H 1/00864 |
| | | | 701/36 |
| 2009/0126901 A1 * | 5/2009 | Hegar | ................ B60H 1/00507 |
| | | | 165/41 |
| 2009/0228155 A1 | 9/2009 | Slifkin et al. | |
| 2009/0229288 A1 * | 9/2009 | Alston | .................... F25B 27/00 |
| | | | 62/236 |
| 2010/0050671 A1 | 3/2010 | Kahl et al. | |
| 2010/0256787 A1 * | 10/2010 | Lee | ..................... H04L 12/2816 |
| | | | 700/90 |
| 2011/0114398 A1 * | 5/2011 | Bianco | ..................... B60K 1/04 |
| | | | 180/65.1 |
| 2011/0162395 A1 * | 7/2011 | Chakiachvili | ....... B60H 1/00014 |
| | | | 62/115 |
| 2012/0111044 A1 | 5/2012 | Chen | |
| 2012/0240608 A1 | 9/2012 | Ito et al. | |
| 2012/0247746 A1 * | 10/2012 | Sakajo | ................ B60H 1/00392 |
| | | | 165/202 |
| 2013/0103324 A1 * | 4/2013 | Waseen | ............... B60H 1/00964 |
| | | | 702/33 |
| 2013/0298575 A1 | 11/2013 | Stark et al. | |
| 2014/0026599 A1 | 1/2014 | Rusignuolo et al. | |
| 2014/0041399 A1 | 2/2014 | Gan et al. | |
| 2014/0283533 A1 * | 9/2014 | Kurtzman | ............... B60R 16/03 |
| | | | 62/56 |
| 2015/0183292 A1 | 7/2015 | Muralidhar et al. | |
| 2015/0184912 A1 | 7/2015 | Nelson et al. | |
| 2015/0188323 A1 | 7/2015 | Muralidhar et al. | |
| 2015/0188360 A1 * | 7/2015 | Doane | ................... H02J 7/0013 |
| | | | 307/9.1 |
| 2015/0231948 A1 | 8/2015 | Kennendy | |
| 2015/0239324 A1 | 8/2015 | Kolda et al. | |
| 2015/0246593 A1 * | 9/2015 | Larson | ............... B60H 1/00764 |
| | | | 62/56 |
| 2015/0274056 A1 * | 10/2015 | Olaleye | ................ B60H 1/3232 |
| | | | 123/179.3 |
| 2015/0291005 A1 * | 10/2015 | Olaleye | ................ B60H 1/3232 |
| | | | 702/183 |
| 2015/0292784 A1 | 10/2015 | Yamanis et al. | |
| 2015/0306937 A1 * | 10/2015 | Kitamura | ........... B60H 1/00764 |
| | | | 701/36 |
| 2015/0316309 A1 | 11/2015 | Reitz et al. | |
| 2015/0321539 A1 | 11/2015 | Mohs et al. | |
| 2015/0328953 A1 | 11/2015 | Sulc et al. | |
| 2015/0345958 A1 * | 12/2015 | Graham | ............. G06Q 10/1095 |
| | | | 701/22 |
| 2015/0349547 A1 | 12/2015 | Jeon | |
| 2016/0322836 A1 | 11/2016 | Muralidhar et al. | |
| 2017/0057323 A1 | 3/2017 | Neu et al. | |
| 2017/0089598 A1 * | 3/2017 | Wallace | ................ F25B 49/005 |
| 2017/0146260 A1 * | 5/2017 | Ribbich | .................... F24F 11/30 |
| 2017/0302200 A1 * | 10/2017 | Marcinkiewicz | ....... H02P 27/06 |
| 2018/0029436 A1 * | 2/2018 | Zaeri | ..................... B60H 1/3232 |
| 2018/0304836 A1 * | 10/2018 | DeCia | ................ B60H 1/00778 |
| 2018/0334012 A1 * | 11/2018 | Geller | ................ B60H 1/00392 |

FOREIGN PATENT DOCUMENTS

| | | |
|---|---|---|
| EP | 0389059 A1 | 9/1990 |
| GB | 2408792 | 11/2005 |
| JP | 2011031736 A | 2/2011 |
| WO | 2015100398 A1 | 7/2015 |
| WO | 2016040435 A1 | 3/2016 |
| WO | 2016196488 A1 | 12/2016 |

* cited by examiner

TRANSPORT REFRIGERATION UNIT CONTROL WITH AN ENERGY STORAGE DEVICE

CROSS-REFERENCE TO RELATED APPLICATIONS

This application claims the benefit of PCT/US2018/036299 filed Jun. 6, 2018, which claims priority to U.S. Provisional Application No. 62/516,218 filed Jun. 7, 2017, which is incorporated herein by reference in its entirety.

BACKGROUND

The following description relates to transport refrigeration units and, more particularly, to controls of transport refrigeration units with energy storage devices.

Environmental concerns and regulations are causing a shift in the design of transport refrigeration units (TRUs) that will make these devices quieter and cleaner in operation. That is, TRUs will have reduced noise levels associated with their operations and will be quieter as a result. Meanwhile, particulates will be eliminated from diesel engines or TRU refrigeration circuits will be reconfigured to use natural refrigerants as primary working fluids to provide for cleaner results. It has been found that an effective way to achieve both quieter and cleaner TRU operation is through a replacement of a diesel engine, which has traditionally been the TRU power source, with a non-diesel energy storage device such as a battery.

BRIEF DESCRIPTION

According to one aspect of the disclosure, a transport refrigeration unit (TRU) system is provided and includes a TRU and an energy storage device (ESD). The TRU includes components which are configured to control an environment and a TRU controller configured to control the components in accordance with component operating settings. The ESD includes an ESD controller receptive of identification data identifying the components, current condition data reflective of current conditions and control data reflective of a temperature profile. The ESD controller is configured to determine the component operating settings in accordance with the identification, current condition and control data and to issue the component operating settings to the TRU controller.

In accordance with additional or alternative embodiments, the TRU further includes compressor discharge and suction pressure and temperature sensors, an evaporator leaving temperature sensor and supply, return and ambient air temperature sensors.

In accordance with additional or alternative embodiments, the identification data includes component model numbers.

In accordance with additional or alternative embodiments, the current condition data includes compressor discharge and suction pressures and temperatures, evaporator temperatures and supply, return and ambient air temperatures.

In accordance with additional or alternative embodiments, the control data includes a set point with a ±Δ temperature band instruction.

In accordance with additional or alternative embodiments, the ESD controller is further configured to determine an energy need of the TRU to operate with the component operating settings and control the ESD to provide energy to the TRU in accordance with the energy need.

In accordance with additional or alternative embodiments, the ESD controller is further configured to monitor energy usage by the TRU, calculate ESD life in accordance with the monitored energy usage and take an action based on the calculated ESD life.

In accordance with additional or alternative embodiments, the taking of the action includes making a decision not to override the control data in an event the ESD life is above a first threshold, making a decision to override the control data in an event the ESD life is between a second and the first threshold and making a decision to issue an alarm in an event the ESD life is below the second threshold.

In accordance with additional or alternative embodiments, in an event the control data is consistent with a first control setting, the making of the decision to override the control data includes changing a set point value and, in an event the control data is consistent with a second control setting, the making of the decision to override the control data includes changing a range value.

According to another aspect of the disclosure, a transport refrigeration unit (TRU) system is provided and includes a TRU and an energy storage device (ESD). The TRU includes components which are configured to control an environment of an interior of a container and a TRU controller which is configured to control the components in accordance with component operating settings. The ESD includes an ESD controller. The TRU and the ESD controllers are communicatively coupled such that the ESD controller is receptive of identification data identifying the components, current condition data reflective of current conditions of the interior and control data reflective of a temperature profile of the interior. The ESD controller is configured to determine the component operating settings in accordance with the identification, current condition and control data and to issue the component operating settings to the TRU controller.

In accordance with additional or alternative embodiments, the TRU further includes compressor discharge and suction pressure and temperature sensors, an evaporator leaving temperature sensor and supply, return and ambient air temperature sensors.

In accordance with additional or alternative embodiments, the identification data includes component model numbers.

In accordance with additional or alternative embodiments, the current condition data includes compressor discharge and suction pressures and temperatures, evaporator temperatures and supply, return and ambient air temperatures.

In accordance with additional or alternative embodiments, the control data includes a set point with a ±Δ temperature band instruction.

In accordance with additional or alternative embodiments, the ESD controller is further configured to determine an energy need of the TRU to operate with the component operating settings and control the ESD to provide energy to the TRU in accordance with the energy need.

In accordance with additional or alternative embodiments, the ESD controller is further configured to monitor energy usage by the TRU, calculate ESD life in accordance with the monitored energy usage and take an action based on the calculated ESD life.

In accordance with additional or alternative embodiments, the taking of the action includes making a decision not to override the control data in an event the ESD life is above a first threshold, making a decision to override the control data in an event the ESD life is between a second and the first threshold and making a decision to issue an alarm in an event the ESD life is below the second threshold.

In accordance with additional or alternative embodiments, in an event the control data is consistent with a first control setting, the making of the decision to override the control data includes changing a set point value and, in an event the control data is consistent with a second control setting, the making of the decision to override the control data includes changing a range value.

According to yet another aspect of the disclosure, a method of operating a transport refrigeration unit (TRU) system is provided. The TRU system includes a TRU and an energy storage device (ESD). The TRU includes components which are configured to control an environment of an interior of a container and a TRU controller which is configured to control the components in accordance with component operating settings. The ESD includes an ESD controller. The method includes receiving, at the ESD controller, identification data identifying the components, current condition data reflective of current conditions of the interior and control data reflective of a temperature profile of the interior, determining, at the ESD controller, the component operating settings in accordance with the identification, current condition and control data and issuing the component operating settings to the TRU controller.

In accordance with additional or alternative embodiments, the method further includes monitoring energy usage by the TRU, calculating ESD life in accordance with the monitored energy usage and taking an action based on the calculated ESD life.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

DETAILED DESCRIPTION

Figure 1:
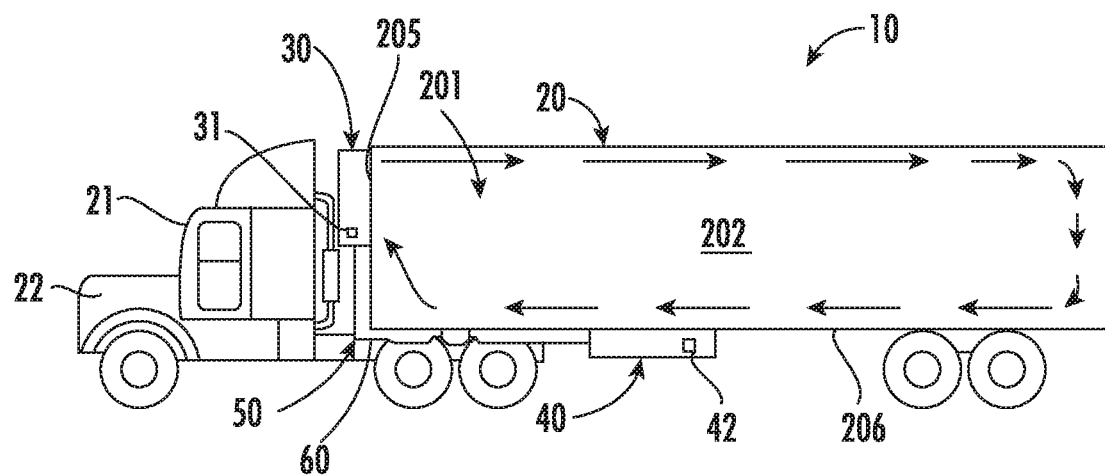
FIG. 1 is a side view of a transport refrigeration unit (TRU) for use with a container formed to define a single compartment in accordance with embodiments.

As will be described below, a non-diesel energy storage device (ESD) is used to provide power to a transport refrigeration unit (TRU) for a trailer having a single compartment or multiple compartments. The ESD includes a controller which communicates with a controller of the TRU to determine an energy need of the TRU and controls the ESD to provide energy to the TRU in accordance with the energy need.

With reference to FIGS. 1-5, a TRU system 10 is provided for use with a container 20 that is pulled by a cab 21 that may be powered by a diesel engine 22 or any other type of fossil fuel burning engine. The TRU system 10 includes a TRU 30, an ESD 40, a communication network 50 and a power network 60. Both the TRU 30 and the ESD 40 are communicatively coupled to the communication network 50. Similarly, both the TRU 30 and the ESD 40 are communicatively coupled to the power network 60.

Figure 2:
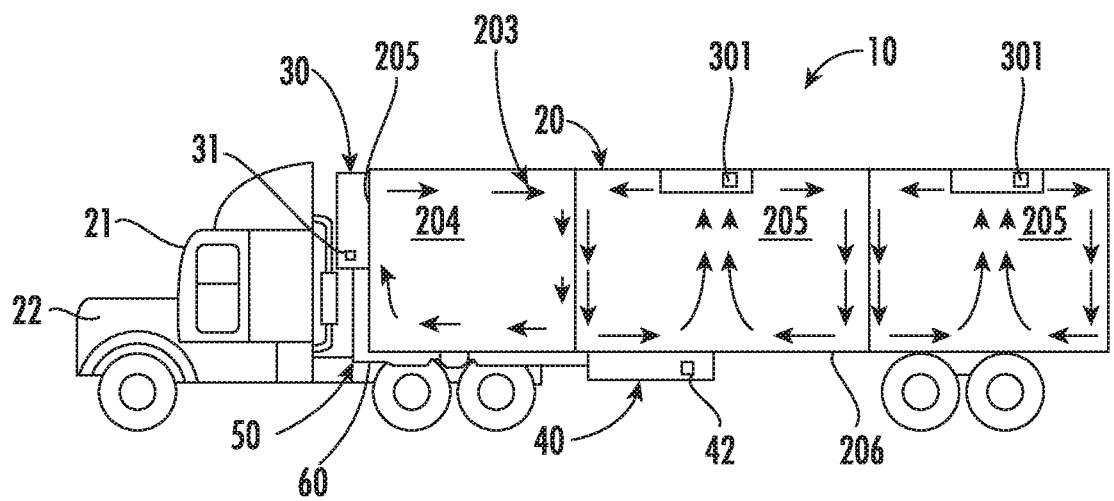
FIG. 2 is a side view of a TRU for use with a container formed to define multiple compartments in accordance with embodiments.

In accordance with embodiments and, shown in FIG. 1, the container 20 may be formed to define an interior 201 with a single compartment 202. In such a case, an interior temperature and other environmental conditions of the signal compartment are controllable by various operations of the TRU 30. In accordance with alternative embodiments and, as shown in FIG. 2, the container 20 may be formed to define an interior 203 with a proximal compartment 204 and remote compartments 205. In such cases, the interior temperatures and other environmental conditions of the proximal compartment are controllable by various operations of the TRU 30 while the interior temperatures and other environmental conditions of the proximal compartment are respectively controllable by various operations of remote TRUs 301. The remote TRUs may be operable dependently or independently of the TRU 30. In any case, the container 20 may further include a plurality of various sensors to measure and monitor environmental conditions therein. These sensors can be configured to transmit sensing data to the TRU 30 as part of a feedback control loop.

Figure 3:
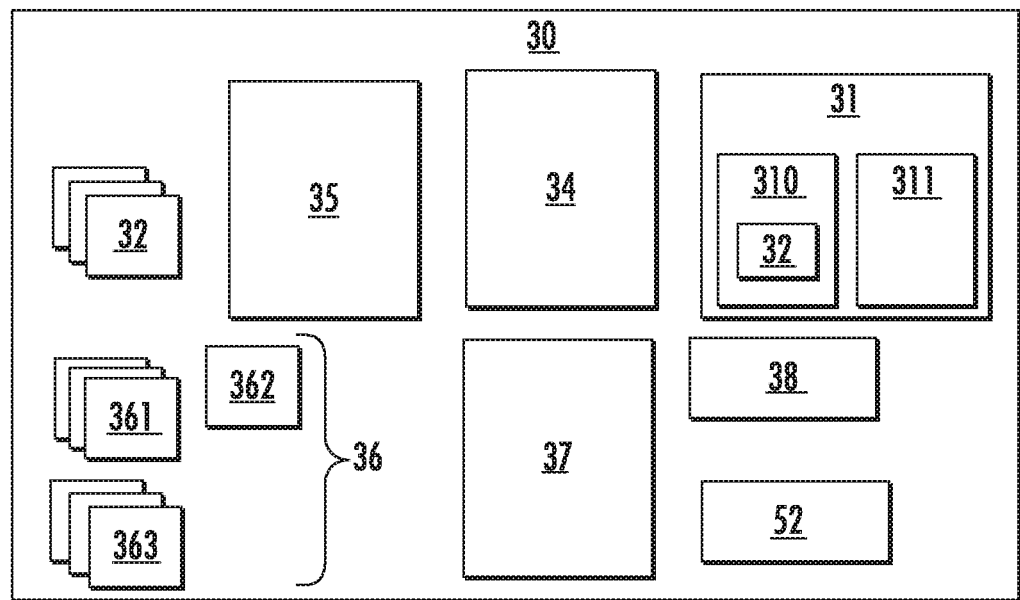
FIG. 3 is a schematic diagram illustrating components of a TRU in accordance with embodiments.

As shown in FIG. 3, the TRU 30 (and the remote TRUs 301, where applicable) includes a TRU controller 31 and various components 32 that are disposed and configured for controlling environmental conditions within the container 20 (e.g., a compressor, an evaporator, a fan, etc.). The TRU controller 31 may include a processor 310 and a memory unit 311 having executable instructions stored thereon, which, when executed, cause the processor 310 to at least be receptive of control data 33 along with sensing data from the sensors of the container 20. The control data 33 is configured to be reflective of temperature profiles of the single compartment 202 or the proximal compartment 204 and the remote compartments 205 in the container 20. When executed, the executable instructions may further cause the processor 310 to operate the various components 32 of the TRU 30 in accordance with the control data 33 so as to maintain respective container interior temperatures that are as close as possible to the temperature profiles of the one or more compartments in the container 20.

Figure 8:
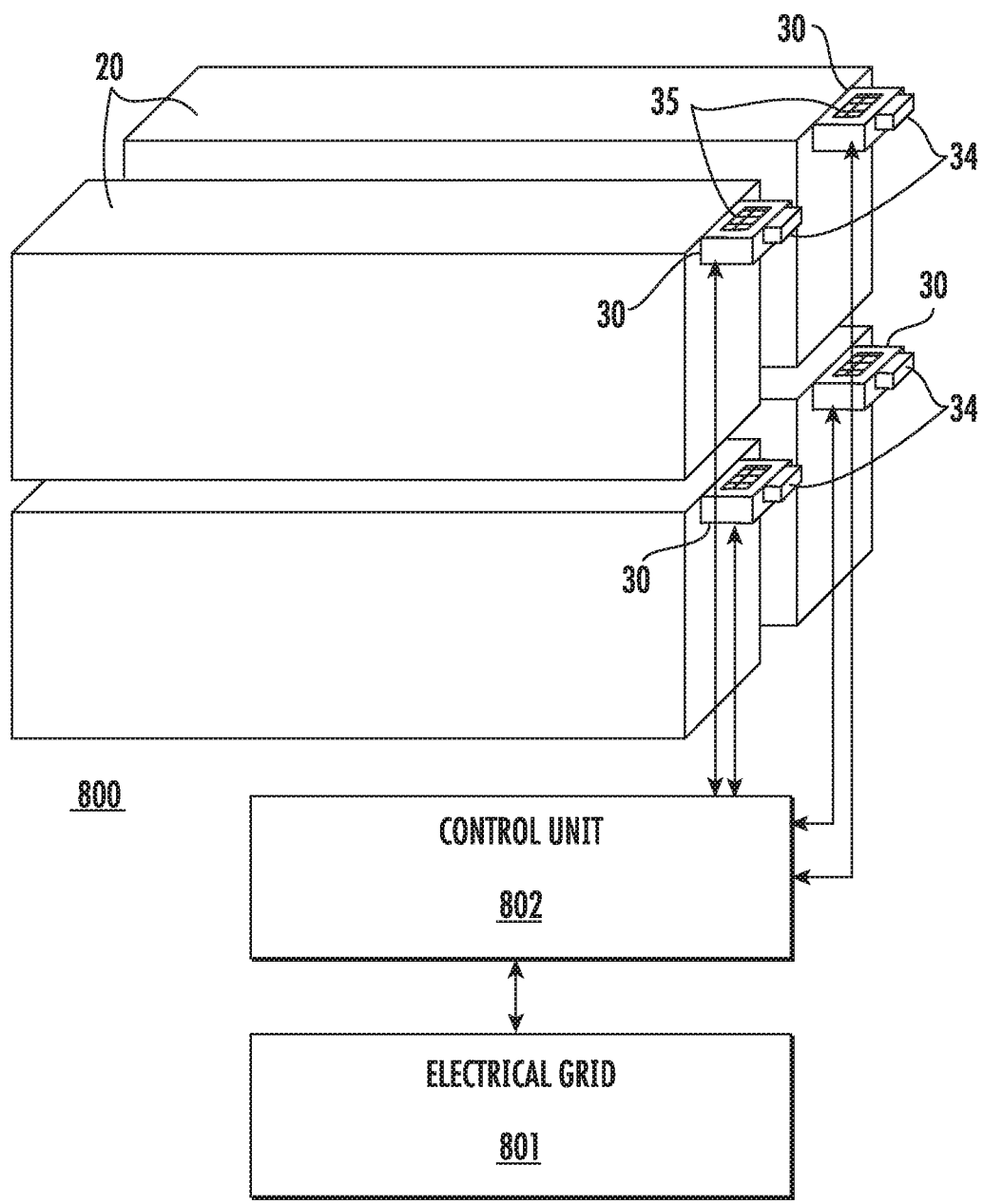
FIG. 8 is a schematic illustration of multiple containers in a warehoused condition.

In accordance with additional embodiments, each TRU 30 may further include a TRU battery pack 34 and a solar panel 35 (see FIG. 8). The TRU battery pack 34 is available for use by at least the TRU controller 31 for operating the various components 32 as need be on at least a limited basis. The solar panel 35 is disposed and configured to generate electrical power from collecting sunlight and may be disposed on an upper surface of the TRU 30.

In accordance with still further embodiments and, as shown in FIG. 3, the TRU 30 may also include a plurality of sensors 36, an input/output (I/O) interface 37 and a timer 38. The plurality of sensors 36 may include compressor discharge and suction pressure and temperature sensors 361, evaporator leaving temperature sensors 362 and supply, return and ambient air temperature sensors 363. The I/O interface 37 is disposed such that the TRU controller 31 is receptive of readings from the plurality of sensors 36 via the I/O interface 37. The timer 38 is configured to timestamp the readings of the plurality of sensors 36. In addition, in these or other cases, the memory unit 311 may be configured to additionally store component identification data, which may be provided as model numbers for each of the various components 32, for example, the readings of the plurality of sensors 36, which is recordable as current condition data, and control data. The control data may include a temperature set point instruction as well as a ±Δ temperature range instruction.

Figure 4:
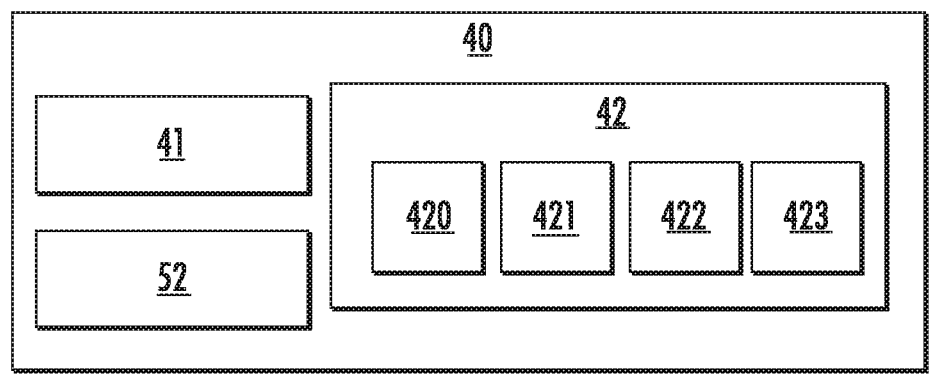
FIG. 4 is a schematic diagram illustrating components of an energy storage device (ESD) in accordance with embodiments.

As shown in FIGS. 1, 2 and 4, the ESD 40 is separate and distinct from the diesel engine 22 and may include a battery or, more particularly, a rechargeable battery 41 and an ESD controller 42. The ESD controller 42 may include a processor 420, a memory unit 421 having executable instructions stored thereon and an I/O interface 422 by which communications to and from the processor 420 proceed. When executed, the executable instructions cause the processor 420 to perform the following operations. For example, when executed, the executable instructions cause the processor 420 to determine an energy need of the TRU 30 to comply with the control data 33 from communications between the ESD controller 42 and the TRU controller 31 via the communication network 50. As another example, when executed, the executable instructions cause the processor 420 to control the ESD 40 to provide energy to the TRU 30 in accordance with the energy need via the power network 60.

In accordance with further embodiments, the executable instructions, when executed, may also cause the processor 420 to identify an additional load 423 which may be coupled to or applied to the ESD 40, to determine that this additional load 423 has an additional energy need and to control the ESD 40 to provide energy to the additional load 421 in accordance with the additional energy need.

The ESD 40 will also allow for export of power to external devices other than the TRU 30. For example, external loads such as lights, lift gates, etc. could be powered from or by the ESD 40 under the control of the ESD controller 42 possibly in conjunction with the TRU controller 31. The TRU 30 may take priority for power use to maintain temperature controls unless otherwise specified.

Figure 5:
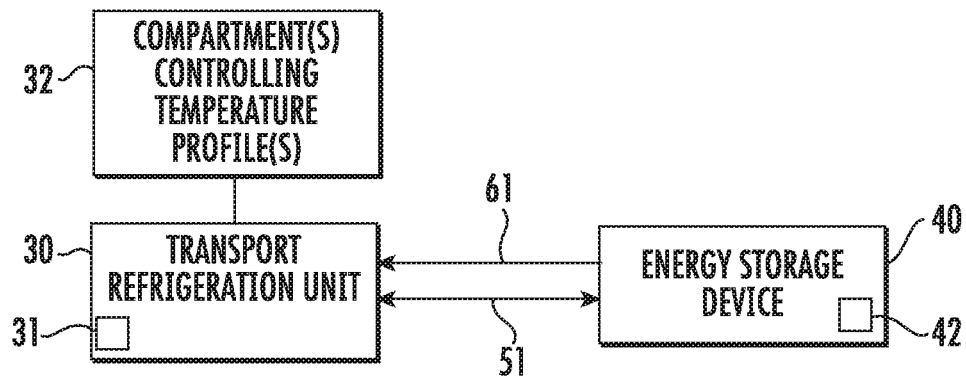
FIG. 5 is a schematic diagram illustrating communications between a TRU and an ESD in accordance with embodiments.

In accordance with embodiments and, as shown in FIGS. 1, 2 and 5, the TRU 30 may be supportively disposable on a side or front wall 205 of the container 20 and the ESD 40 may be supportively disposable on an underside 206 of the container 20. In these or other cases, the communication and power networks 50 and 60 may respectively include wiring 51 and 61 that are respectively routable along an exterior (i.e., along the underside 206 and the front wall 205) of the container 20. The wiring 51 and 61 will be sized, insulated and protected to communicate data with little or no interference or to conduct electrical power in various environmental conditions to which the TRU system 10 is exposed.

In accordance with alternative embodiments and, as shown in FIGS. 3 and 4, at least the communication network 50 may include a wireless communication pathway which is enabled by respective transmit/receive (T/R) modules 52 in the TRU controller 31 and the ESD controller 42. The power network 60 may also include at least a portion which is configured as a wireless network.

Figure 6:
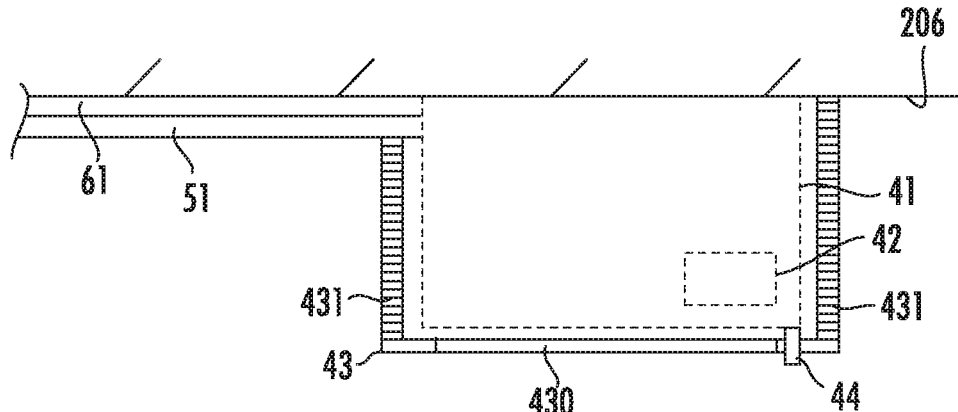
FIG. 6 is a schematic side view of a housing of an ESD in accordance with embodiments.

With reference to FIG. 6, the ESD 40 will be designed mechanically to withstand all vibration and shock seen in transport environments. This will include providing the ESD 40 with proper mounting that will prevent damage or inadvertent disconnection. To this end, the ESD 40 includes the battery or, more particularly, the rechargeable battery 41 and the ESD controller 42 and may also include a housing 43 for housing the rechargeable battery 41 and the ESD controller 42 as well as an external power input 44 by which current can be directed from an external source toward the rechargeable battery 41 for charging and recharging purposes. As shown in FIG. 6, the housing 43 is configured to protect the ESD 40 from environmental conditions, such as road debris, moisture and corrosion, and may include an access panel 430 by which a serviceman can access the ESD 40 for servicing or replacement and vents 431 for defining a coolant pathway along which airflow can be directed to cool the rechargeable battery 41.

In accordance with embodiments, the external source may be any one or more of an electrical grid (see, e.g., electrical grid 801 of FIG. 8), solar panels operably disposed on either containers 20 or TRUs 30 (see, e.g., the solar panels 35 of FIG. 8), another storage device or a power generation source. In any case, the external source will provide for supplemental power and/or restoration of power of the rechargeable battery 41. In addition, the external power input 44 may be connectable to the external power source by way of a receptacle. This receptacle may be user accessible, requires no tools to connect and may be protected against environmental conditions such as moisture, dust, etc.

Figure 7:
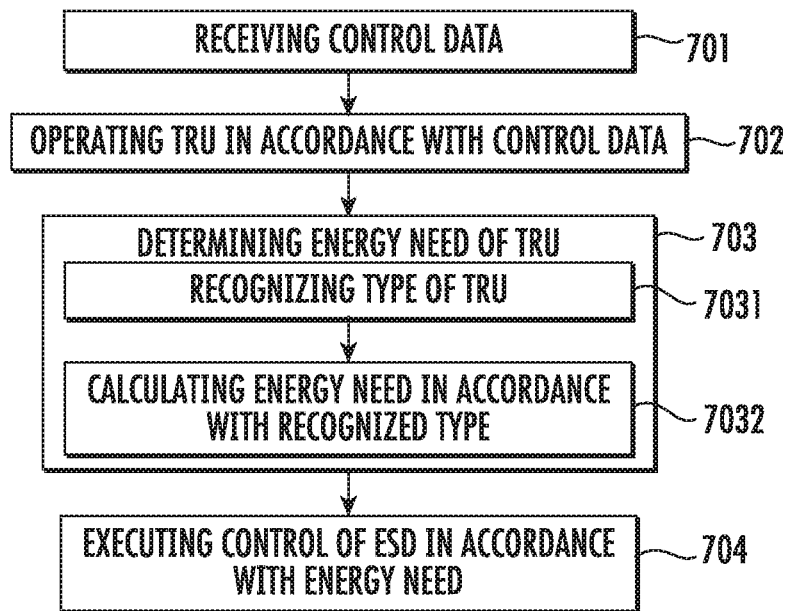
FIG. 7 is a flow diagram illustrating a method of operating a TRU system for use with a container pulled by a cab powered by a diesel engine in accordance with embodiments.

With reference to FIG. 7, a method of operating the TRU system 10 is provided. As shown in FIG. 7, the method includes receiving, at the TRU controller 31, the control data 33 (block 701) and operating the TRU 30 in accordance with at least the control data 33 (block 702). The method further includes determining, at the ESD controller 42, an energy need of the TRU 30 to comply with the control data 33 from communications between the TRU and ESD controllers 31 and 42 via the communications network 50 (block 703). In addition, the method includes executing control of the ESD 40 by the ESD controller 42 to provide energy to the TRU 30 in accordance with the energy need via a power network 60.

In accordance with embodiments, the determining of block 703 may include recognizing, at the ESD controller 42, a type of the TRU 30 from identification information transmitted from the TRU 30 or the TRU controller 31 to the ESD controller 42 (block 7031) and calculating, at the ESD controller 42, the energy need of the TRU 30 in accordance with the recognized type of the TRU 30 (block 7032).

The description provided above relates to systems and methods of operating a TRU using a non-diesel ESD to thus provide for quieter and cleaner overall TRU operation as compared to what is otherwise possible with a traditional diesel engine power source. The description is applicable to any TRU (trailer or truck units) using any refrigeration working fluid (e.g., R-404a, R-452a, R-744, carbon dioxide, etc.).

As will be described below, a control scheme and power architecture is provided to allow a TRU 30 to comply or communicate with grid demand depending on a current load profile and TRU use.

With reference back to FIG. 3 and with additional reference to FIG. 8, a transport refrigeration unit (TRU) system 800 is provided. As separately shown in FIGS. 3 and 8, the TRU system 800 includes containers 20, TRUs 30, an electrical grid 801 and a control unit 802. Each respective TRU 30 is operably coupled to a corresponding one of the containers 20 and is configured substantially as described above. That is, each TRU 30 includes the TRU controller 31, the various components 32 that are configured to control an environment within an interior of the corresponding container 20, the TRU battery pack 34 that is configured to store energy for powering at least the various components 32 and the solar panel 35. The electrical grid 801 may have multiple generators and loads electrically coupled thereto such that those multiple generators and loads are in turn coupled to the TRUs 30.

The control unit 802 is communicative with the TRU controllers 31 of each of the TRUs 30 and with the electrical grid 801 and is configured to manage power supplies and demands between the TRU battery pack 34 of each of the TRUs 30 and the electrical grid 801. The control unit 802 may be remote from and communicatively coupled with the TRU controllers 31 or may be distributed throughout the TRU system 800 so as to be embodied in some or all of the TRU controllers 31.

In any case, a capacity of one or more of the TRU battery packs 34 is made available to the electrical grid 801 by the control unit 802. To this end, an availability of the capacity of the one or more TRU battery packs 34 is controlled by the control unit 802 in accordance with one or more of a loading schedule of each of the containers 20, a current loading or cooling condition of each of the containers 20 and current or predicted ambient conditions in and around each of the containers 20. That is, where the control unit 802 is embodied in some or all of the TRU controllers 31, the executable instructions of the memory unit 311 cause the processor 310 to determine at least one or more of a loading schedule of each of the containers 20, a current loading or cooling condition of each of the containers 20 and current or predicted ambient conditions in and around each of the containers 20 and to make a decision relating to an amount of power that can be provided to the electrical grid 801 from the TRU battery packs 34 without sacrificing performance accordingly.

For example, a TRU battery pack 34 of a TRU 30 of an empty container 20, which is stowed at a warehouse and which is not scheduled to be loaded for multiple days, can be employed to serve as a load leveling or energy arbitrage device for the electrical grid 801. As another example, where certain TRUs 30 are fitted with solar panels 35, the control unit 802 can prioritize the use of electrical power generated by those solar panels for battery charging purposes or grid sale based on at least one or more of a loading schedule of each of the containers 20, a current loading or cooling condition of each of the containers 20 and current or predicted ambient conditions in and around each of the containers 20.

Figure 9:
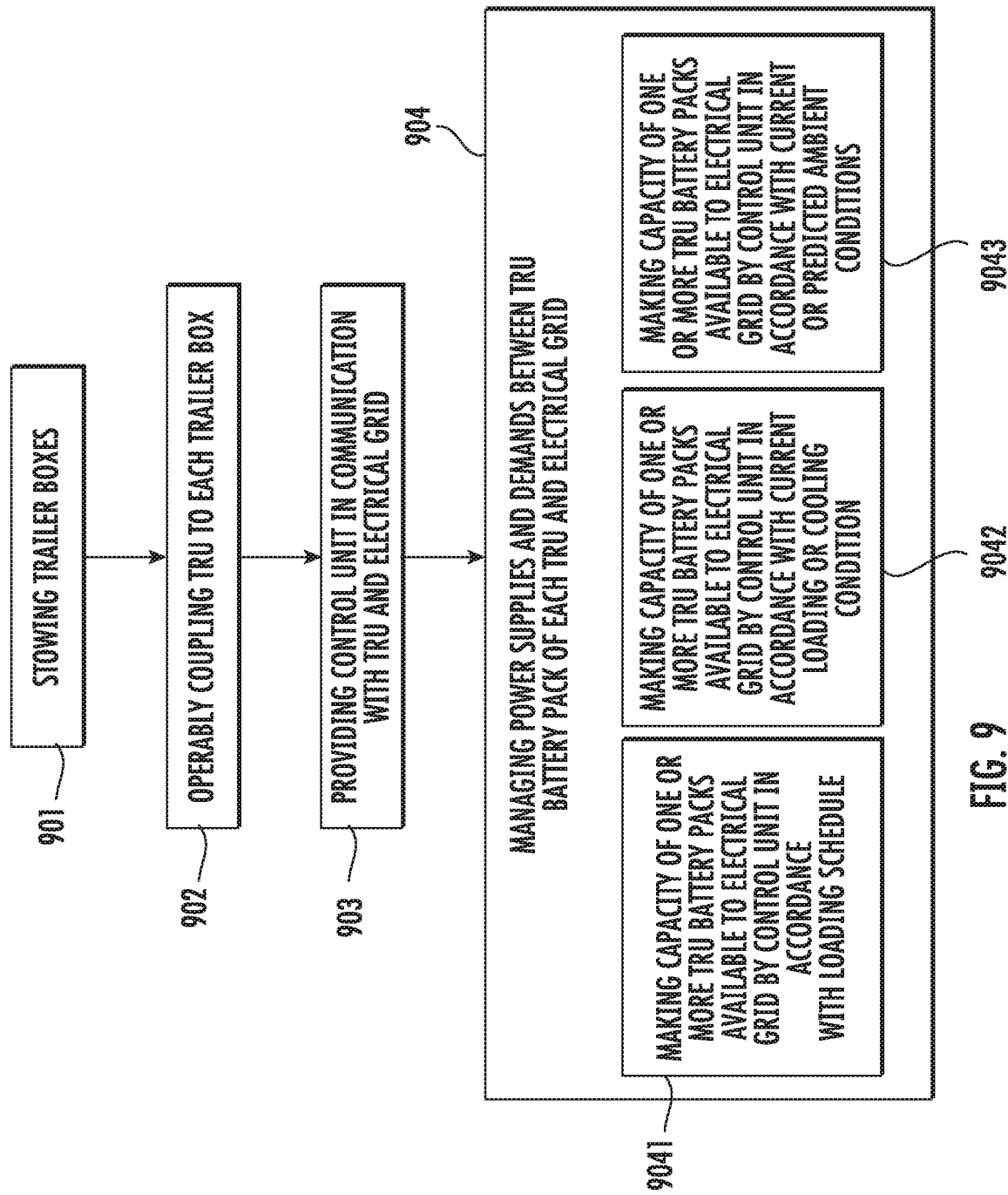
FIG. 9 is a flow diagram illustrating a method of operating a TRU system in accordance with embodiments.

With reference to FIG. 9, a method of operating a transport refrigeration unit (TRU) system is provided. As shown in FIG. 9, the method includes stowing one or more containers 20 (block 901), operably coupling a TRU 30 to each of the one or more containers 20 with each TRU 30 including thee various components 32 configured to control an environment within an interior of the corresponding container 20 and a TRU battery pack 34 (block 902), providing a control unit 802 in communication with the TRU 30 and an electrical grid 801 (block 903) and managing power supplies and demands between the TRU battery pack 34 of each TRU 30 and the electrical grid 801 (block 904). Here, the managing of block 904 may include making a capacity of one or more TRU battery packs 34 available to the electrical grid 801 by the control unit 802 in accordance with one or more of a loading schedule (block 9041), a current loading or cooling condition (block 9042) and current or predicted ambient conditions (block 9043).

The description provided herein of smart grid integration allows for economic rebates and utility rebates. Smart communication and predictive load requirements can inform warehouse customers with regards to their expected peak energy requirements. Solar Panel fitted TRU's can sell energy during peak production hours over prioritizing battery and unit charging.

As will be described below, systems and methods of TRU control are provided for a non-diesel ESD, such as a battery pack, as determined by a controlling temperature profile of container cooling compartments. Here, component refrigeration controls are shifted from the traditional TRU controller to the ESD controller by setting refrigeration component operating settings in the ESD controller with consideration given to both the power needed to operate the various components of the TRU and the proper settings to meet TRU refrigeration needs as set by the controlling temperature profile(s). Once the settings are known, the information is passed back to the TRU controller and the TRU operates accordingly.

Figure 10:
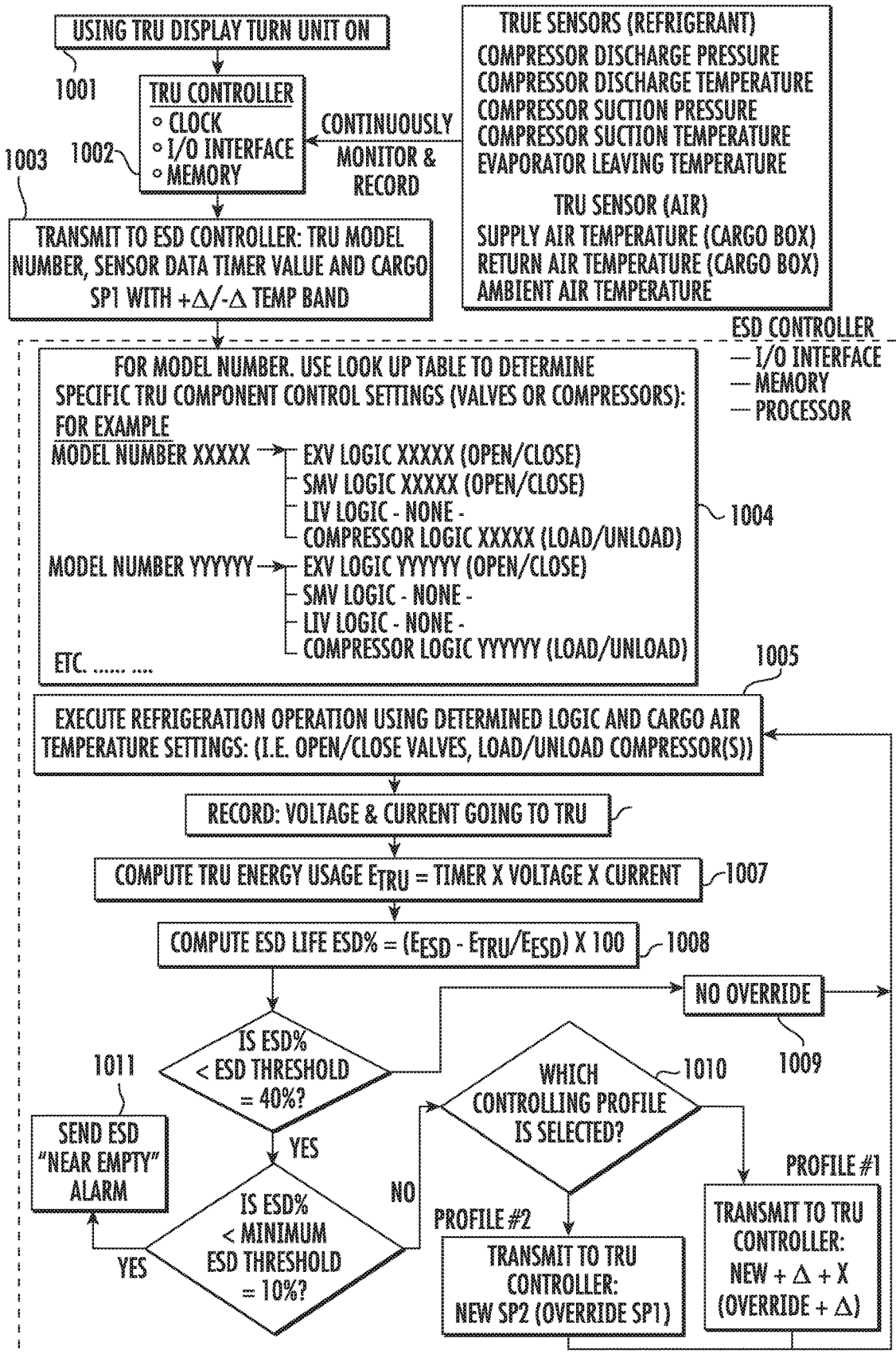
FIG. 10 is a flow diagram illustrating a method of operating a TRU system in accordance with embodiments.
Figure 11:
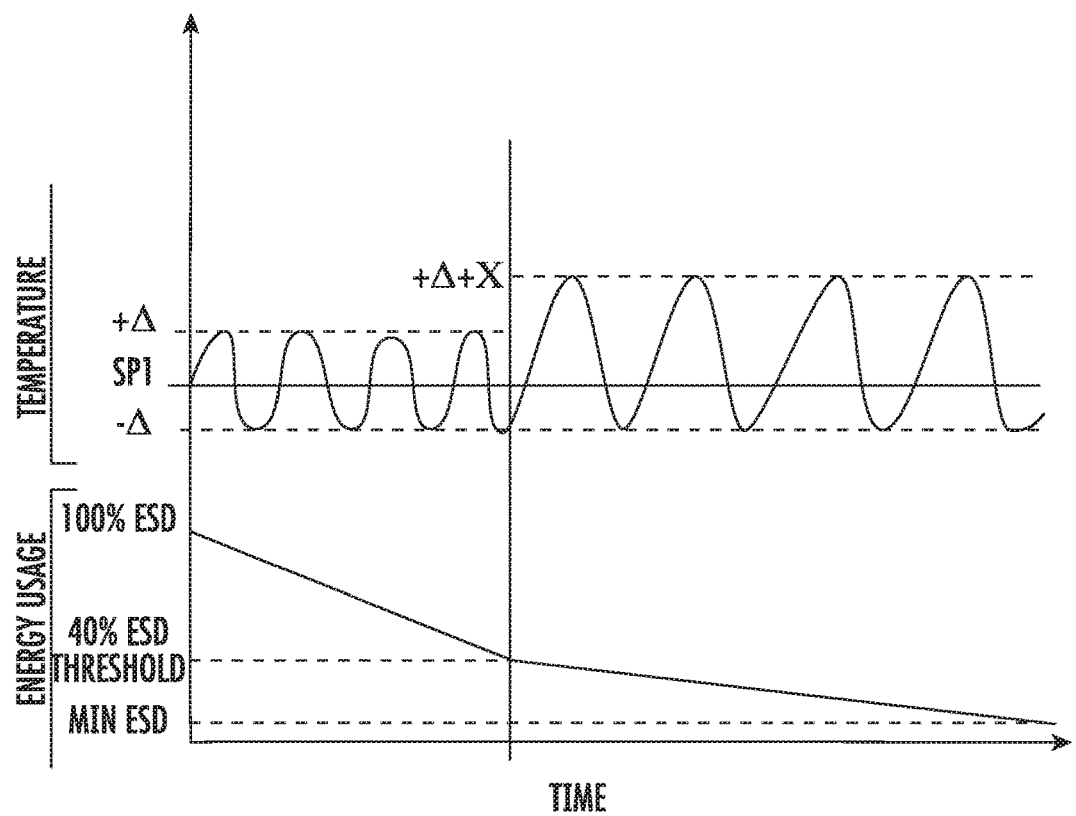
FIG. 11 is a graphical display of various temperature set points and ±A temperature ranges in accordance with embodiments.
Figure 12:
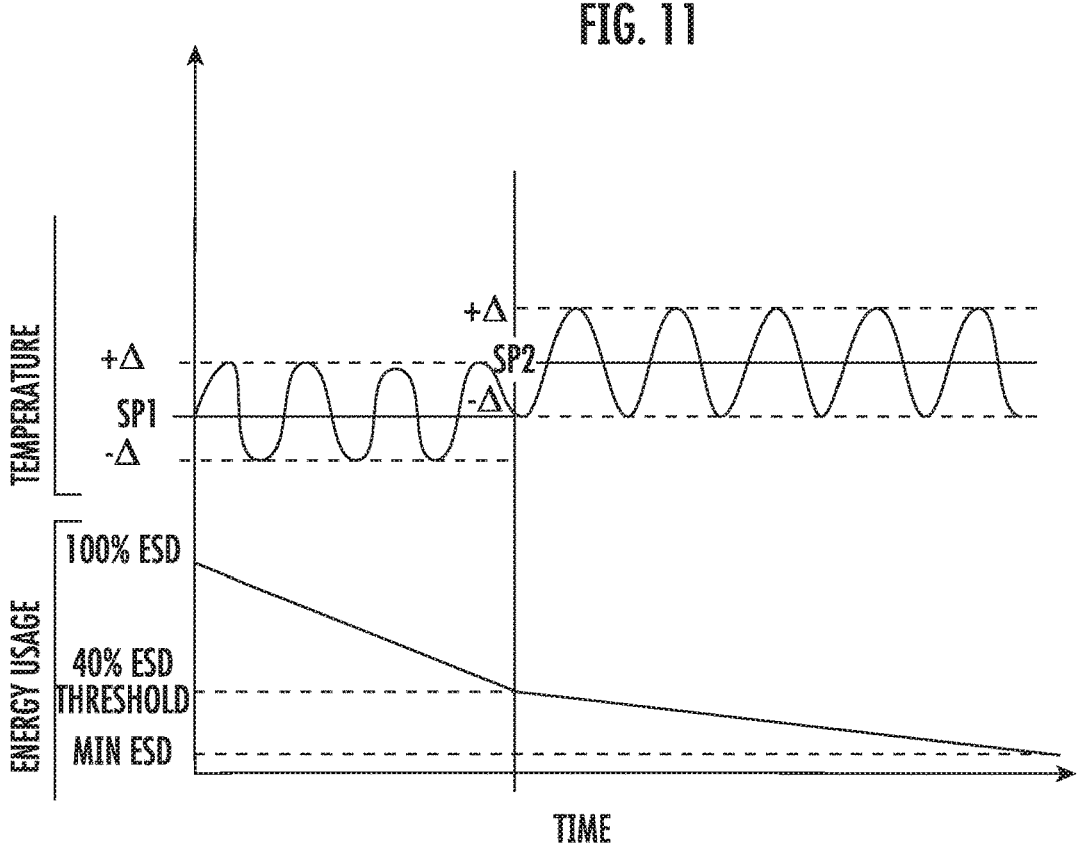
FIG. 12 is a graphical display of various temperature set points and ±A temperature ranges in accordance with embodiments.

Thus, with reference to FIGS. 10-12, a method of operating a transport refrigeration unit (TRU) system is provided and includes starting a TRU 30 such that the various components 32 control an environment of an interior of a container 20 with the TRU controller 31 controlling the various components 32 in accordance with component operating settings (block 1001). Subsequently, the TRU controller 31 collects current condition data that is reflective of current conditions of the interior of the container 20 from the plurality of sensors 36 (block 1002) and, with the TRU and the ESD controllers 31 and 42 being established, the TRU controller 31 transmits identification data identifying the various components 32, the current condition data and control data that is reflective of a temperature profile of the interior of the container 20 to the ESD controller 42 (block 1003). The ESD controller 42 then looks up component control settings of each of the various components 32 in accordance with the identification data (block 1004). At this point, the ESD controller 42 determines the component operating settings in accordance with the component control settings associated with the identification data as well as the current condition and control data and issues the component operating settings to the TRU controller 31 (block 1005).

In accordance with embodiments, the identification data may include model numbers of the various components 32, the current condition data may include compressor discharge and suction pressure and temperatures, evaporator temperatures and supply, return and ambient air temperatures and the control data may include a temperature set point instruction with a ±Δ temperature band instruction.

Once the ESD controller 42 issues the component operating settings to the TRU controller 31, the ESD controller 42 calculates an energy need of the TRU 30 to operate according to the component operating settings and controls the ESD 40 to provide energy to the TRU 30 in accordance with the energy need while monitoring this energy usage by the TRU 30 by, for example, recording voltage and current supplied by the ESD 40 to the TRU 30 (block 1006). The ESD controller 42 then computes TRU energy usage over time (block 1007) and calculates ESD life in accordance with the monitored energy usage (block 1008).

The ESD controller 42 then takes an action based on the calculated ESD life. Such action may include making a decision not to override the control data in an event the ESD life is above a first threshold (block 1009), making a decision to override the control data in an event the ESD life is between a second and the first threshold (block 1010) and/or making a decision to issue an alarm in an event the ESD life is below the second threshold (block 1011). Here, in an event the ESD life is between a second and the first threshold and in an event the control data is consistent with a first control setting, the making of the decision to override the control data comprises changing a temperature set point value (see, e.g., the changing of SP1 to SP2 in FIG. 12). By contrast, in an event the ESD life is between a second and the first threshold and in an event the control data is consistent with a second control setting, the making of the decision to override the control data comprises changing a set point and range values (see, e.g., the changing of the ±Δ temperature range value in FIG. 11 with or without an additional temperature set point change).

The description provided above relates to TRU operation of a non-diesel energy source that results in both quieter and cleaner overall TRU operations as compared to a traditional diesel power source and can be used with any TRU using any refrigeration working fluid.

As will be described below, methods of TRU energy control are provided for a non-diesel ESD and are determined by controlling temperature profiles of container cooling compartments.

Figure 13:
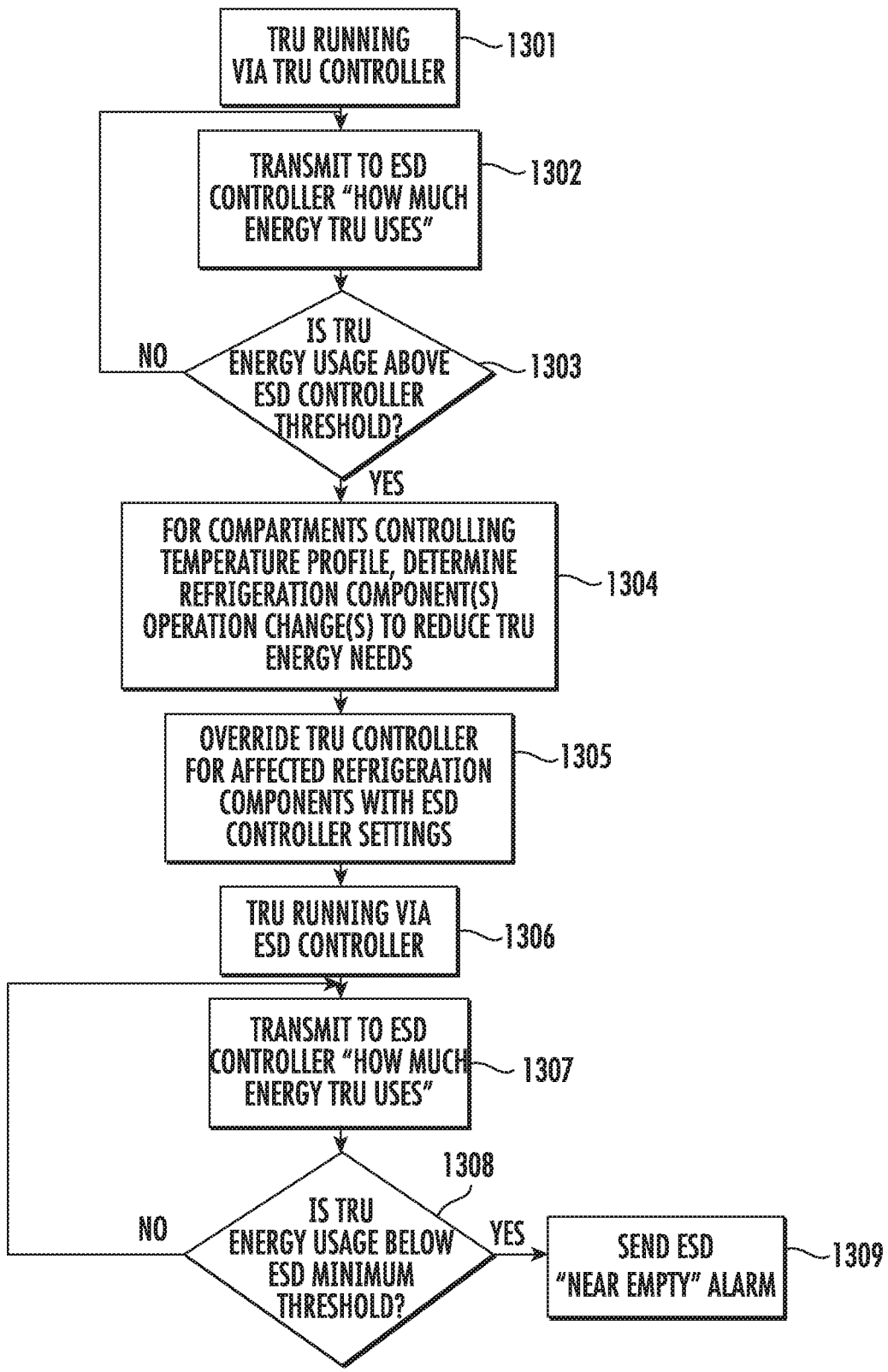
FIG. 13 is a flow diagram illustrating a method of operating a TRU system in accordance with embodiments.
Figure 14:
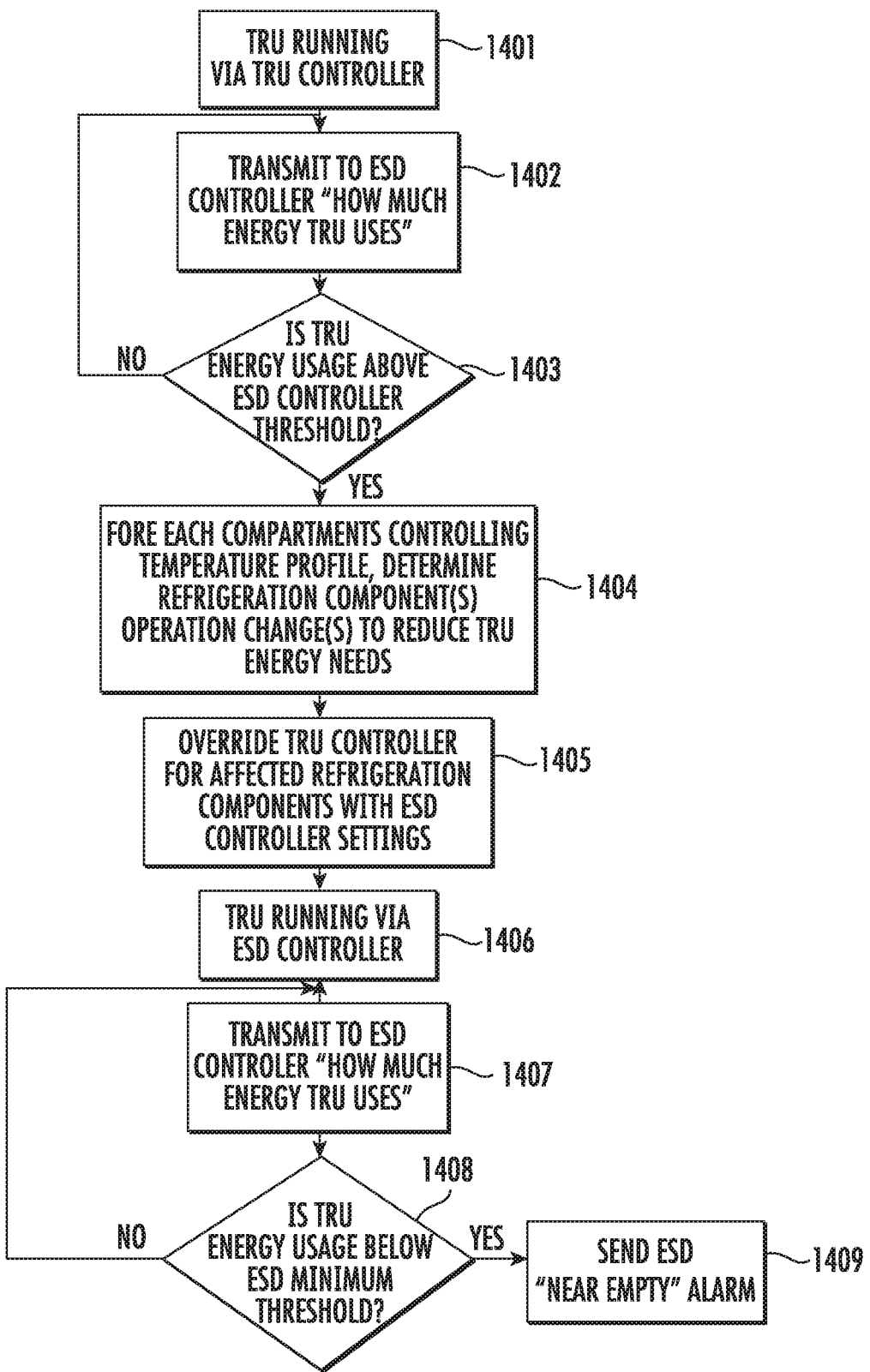
FIG. 14 is a flow diagram illustrating a method of operating a TRU system in accordance with embodiments.

With reference to FIGS. 13 and 14, the methods include controlling the various components 32 to control an environment in a single compartment interior as shown in FIG. 13 or to control environments in multiple compartment interiors as shown in FIG. 14 (blocks 1301 and 1401) and monitoring energy usage by the components being controlled in accordance with the initial control settings for transmission to the ESD controller 42 (blocks 1302 and 1402). The methods thus include determining whether the energy usage is above a threshold (blocks 1303 and 1403) and reverting to blocks 1302 and 1402 if not. On the other hand, in an event the energy usage is above the threshold, the methods further include identify operational changes for one or more of the components or for one or more of the components of each of the multiple compartment interiors to reduce the energy usage (blocks 1304 and 1404), overriding the initial control settings of the one or more of the components with new control settings (blocks 1305 and 1405) and operating the components in accordance with the new control settings (blocks 1306 and 1406).

As shown in FIGS. 13 and 14, the methods further include monitoring energy usage by the components being controlled in accordance with the new control settings for transmission to the ESD controller 42 (blocks 1307 and 1407), determining whether the energy usage is below a minimum threshold (blocks 1308 and 1408) and issuing an alarm in an event the energy usage is below the minimum threshold (blocks 1309 and 1409).

The description provided above relates to TRU operation of a non-diesel energy source that results in both quieter and cleaner overall TRU operations as compared to a traditional diesel power source and can be used with any TRU using any refrigeration working fluid.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A transport refrigeration unit (TRU) system, comprising:
a TRU comprising components which are configured to control an environment and a TRU controller configured to control the components in accordance with component operating settings; and
an energy storage device (ESD) comprising an ESD controller,
the ESD controller being receptive of identification data identifying the components and from which an energy need of the TRU is calculatable, current condition data reflective of current conditions of an interior of a container and control data reflective of a temperature profile of the interior of the container, and
the ESD controller being configured to determine the component operating settings in accordance with the identification, current condition and control data considering the energy need of the TRU and TRU refrigeration needs as set by the temperature profile and to issue the component operating settings to the TRU controller.

2. The TRU system according to claim 1, wherein the TRU further comprises:
compressor discharge and suction pressure and temperature sensors;
an evaporator leaving temperature sensor; and
supply, return and ambient air temperature sensors.

3. The TRU system according to claim 1, wherein the identification data comprises component model numbers.

4. The TRU system according to claim 1, wherein the current condition data comprises compressor discharge and suction pressures and temperatures, evaporator temperatures and supply, return and ambient air temperatures.

5. The TRU system according to claim 1, wherein the control data comprises a set point with a ±Δ temperature band instruction.

6. The TRU system according to claim 1, wherein the ESD controller is further configured to:
determine the energy need of the TRU to operate with the component operating settings; and
control the ESD to provide energy to the TRU in accordance with the energy need.

7. The TRU system according to claim 6, wherein the ESD controller is further configured to:

monitor energy usage by the TRU;
calculate ESD life in accordance with the monitored energy usage; and
take an action based on the calculated ESD life.

8. The TRU system according to claim 7, wherein the taking of the action comprises:
making a decision not to override the control data in an event the ESD life is above a first threshold;
making a decision to override the control data in an event the ESD life is between a second and the first threshold; and
making a decision to issue an alarm in an event the ESD life is below the second threshold.

9. The TRU system according to claim 8, wherein:
in an event the control data is consistent with a first control setting, the making of the decision to override the control data comprises changing a set point value, and
in an event the control data is consistent with a second control setting, the making of the decision to override the control data comprises changing a range value.

10. A transport refrigeration unit (TRU) system, comprising:
a TRU comprising components which are configured to control an environment of an interior of a container and a TRU controller which is configured to control the components in accordance with component operating settings; and
an energy storage device (ESD) comprising an ESD controller,
the TRU and the ESD controllers being communicatively coupled such that the ESD controller is receptive of identification data identifying the components and from which an energy need of the TRU is calculatable, current condition data reflective of current conditions of the interior and control data reflective of a temperature profile of the interior, and
the ESD controller being configured to determine the component operating settings in accordance with the identification, current condition and control data considering the energy need of the TRU and TRU refrigeration needs as set by the temperature profile and to issue the component operating settings to the TRU controller.

11. The TRU system according to claim 10, wherein the TRU further comprises:
a plurality of sensors, comprising:
compressor discharge and suction pressure and temperature sensors;
an evaporator leaving temperature sensor; and
supply, return and ambient air temperature sensors;
an input/output (I/O) interface by which the TRU controller is receptive of readings from the plurality of sensors;
a timer to timestamp the readings; and
a memory to store the identification data, the readings as the current condition data and the control data.

12. The TRU system according to claim 10, wherein the identification data comprises model numbers of the components.

13. The TRU system according to claim 10, wherein the current condition data comprises compressor discharge and suction pressure and temperatures, evaporator temperatures and supply, return and ambient air temperatures.

14. The TRU system according to claim 10, wherein the control data comprises a set point with a ±Δ temperature band instruction.

15. The TRU system according to claim 10, wherein the ESD controller is further configured to:
determine the energy need of the TRU to operate with the component operating settings; and
control the ESD to provide energy to the TRU in accordance with the energy need.

16. The TRU system according to claim 15, wherein the ESD controller is further configured to:
monitor energy usage by the TRU;
calculate ESD life in accordance with the monitored energy usage; and
take an action based on the calculated ESD life.

17. The TRU system according to claim 16, wherein the taking of the action comprises:
making a decision not to override the control data in an event the ESD life is above a first threshold;
making a decision to override the control data in an event the ESD life is between a second and the first threshold; and
making a decision to issue an alarm in an event the ESD life is below the second threshold.

18. The TRU system according to claim 17, wherein:
in an event the control data is consistent with a first control setting, the making of the decision to override the control data comprises changing a set point value, and
in an event the control data is consistent with a second control setting, the making of the decision to override the control data comprises changing a range value.

19. A method of operating a transport refrigeration unit (TRU) system, comprising
a TRU comprising components which are configured to control an environment of an interior of a container and a TRU controller which is configured to control the components in accordance with component operating settings; and
an energy storage device (ESD) comprising an ESD controller, the method comprising:
receiving, at the ESD controller, identification data identifying the components and from which an energy need of the TRU is calculatable, current condition data reflective of current conditions of the interior and control data reflective of a temperature profile of the interior;
determining, at the ESD controller, the component operating settings in accordance with the identification, current condition and control data considering the energy need of the TRU and TRU refrigeration needs as set by the temperature profile; and
issuing the component operating settings to the TRU controller.

20. The method according to claim 17, further comprising:
monitoring energy usage by the TRU;
calculating ESD life in accordance with the monitored energy usage; and
taking an action based on the calculated ESD life.

* * * * *